(12) United States Patent
Dueker et al.

(10) Patent No.: US 11,827,134 B2
(45) Date of Patent: Nov. 28, 2023

(54) TABLE DEVICE FOR A VEHICLE, AND VEHICLE

(71) Applicant: Daimler AG, Stuttgart (DE)

(72) Inventors: Christoph Dueker, Herrenberg (DE); Jan Husser, Ettlingen (DE)

(73) Assignee: Daimler AG, Stuttgart (DE)

( * ) Notice: Subject to any disclaimer, the term of this patent is extended or adjusted under 35 U.S.C. 154(b) by 9 days.

(21) Appl. No.: 17/611,000

(22) PCT Filed: May 11, 2020

(86) PCT No.: PCT/EP2020/063002
§ 371 (c)(1),
(2) Date: Nov. 12, 2021

(87) PCT Pub. No.: WO2020/229387
PCT Pub. Date: Nov. 19, 2020

(65) Prior Publication Data
US 2022/0227277 A1 Jul. 21, 2022

(30) Foreign Application Priority Data

May 13, 2019 (DE) ..................... 10 2019 003 355.8

(51) Int. Cl.
*B60N 3/00* (2006.01)
(52) U.S. Cl.
CPC ................................... *B60N 3/002* (2013.01)
(58) Field of Classification Search
CPC ........... B60N 3/002; A47B 3/063; A47B 3/14; A47B 2003/145; A47B 83/02; A47C 7/624; A47C 7/68; A47C 7/70

(Continued)

(56) References Cited

U.S. PATENT DOCUMENTS

| 4,834,449 A | * | 5/1989 | Engelman | ................. | A61G 5/10 |
|  |  |  |  |  | 297/145 |
| 6,220,658 B1 | * | 4/2001 | Lukawski | ................. | A47C 7/70 |
|  |  |  |  |  | 297/145 |

(Continued)

FOREIGN PATENT DOCUMENTS

| DE | 10 2011 110 549 A1 | 5/2013 |
| DE | 10 2012 002 562 A1 | 8/2013 |

(Continued)

OTHER PUBLICATIONS

PCT/EP2020/063002, International Search Report dated Jul. 22, 2020 (Three (3) pages).

(Continued)

*Primary Examiner* — Jose V Chen
(74) *Attorney, Agent, or Firm* — Crowell & Moring LLP

(57) ABSTRACT

A table device for a vehicle includes a table element positionable from a non-working position to a working position, where in the non-working position the table element is arrangeable vertically in a central console. The table element is disposed on a bracket and the bracket is electrically positionable by a rotary drive where the rotary drive is configured for swivelling the bracket about an axis running parallel to a transverse axis of the vehicle in a direction of a longitudinal axis of the vehicle from the non-working position to an operational position for assuming the working position of the table element. The table element has two parts which, in the non-working position, are folded-up and abut against one another and which, for converting to the working position, are hinged about an axis running horizontally such that respective faces of the two parts run at least essentially in a horizontal plane.

7 Claims, 5 Drawing Sheets

(58) Field of Classification Search
USPC .......... 108/44; 297/173, 160, 155, 154, 145, 297/135
See application file for complete search history.

(56) References Cited

U.S. PATENT DOCUMENTS

| | | | | |
|---|---|---|---|---|
| 8,474,384 | B2* | 7/2013 | Sundarrao | A47B 5/006 108/42 |
| 11,299,276 | B2* | 4/2022 | Rife | B60N 3/002 |
| 2006/0220425 | A1* | 10/2006 | Becker | A47C 7/70 297/188.16 |
| 2010/0171350 | A1* | 7/2010 | Large | B64D 11/00153 297/217.3 |
| 2010/0231009 | A1* | 9/2010 | Chi | A47C 7/407 297/148 |
| 2015/0321592 | A1* | 11/2015 | De Morais | B64D 11/0646 297/135 |
| 2015/0329062 | A1* | 11/2015 | Ackeret | B60R 11/0241 248/220.22 |
| 2016/0272098 | A1 | 9/2016 | Barnes | |
| 2016/0375810 | A1* | 12/2016 | Kong | B60N 3/002 297/145 |
| 2019/0061954 | A1* | 2/2019 | Miedema | A47B 3/00 |
| 2019/0135152 | A1* | 5/2019 | Kim | B60N 3/002 |
| 2019/0175426 | A1* | 6/2019 | Pengelly | A47C 7/68 |

FOREIGN PATENT DOCUMENTS

| | | |
|---|---|---|
| DE | 10 2014 207 451 A1 | 10/2015 |
| GB | 2519603 A | 4/2015 |
| KR | 10-2011-0127782 A | 11/2011 |
| KR | 10-2019-0033337 A | 3/2019 |
| WO | WO 02/44646 A2 | 6/2002 |

OTHER PUBLICATIONS

German-language German Office Action issued in German application No. 10 2019 003 355.8 dated Jan. 23, 2020 (Six (6) pages).

* cited by examiner

TABLE DEVICE FOR A VEHICLE, AND VEHICLE

BACKGROUND AND SUMMARY OF THE INVENTION

The invention relates to a table device for a passenger compartment of a vehicle with a table element positionable from a non-working position to a working position. The invention further relates to a vehicle with the table device.

A table device for a motor vehicle passenger compartment is known from DE 10 2014 207 451 A1. The table device comprises a table element that is moveable or convertible by means of an adjusting mechanism from a non-working position, i.e., from a stowage position, to a working position, i.e., operational position. Furthermore, the table device has an interior trim element of the motor vehicle passenger compartment, wherein the table element in the non-working position is a visible, flat component of the visible external contour of the interior trim element.

Furthermore, a swing-out table element is known from US 2016/0272098 A1, in which the table can be converted by a swivel element from a working to a non-working position.

The object of the invention is to provide an improved table device and an improved vehicle, relative to the prior art.

A table device for a passenger compartment of a vehicle comprises a table element that is positionable from a non-working position to a working position. According to the invention, in the non-working position the table element is arranged vertically in a central console and a rotary drive is provided for the electrical positioning of a bracket, on which the table element is arranged, wherein the rotary drive is configured for swivelling the bracket about an axis running parallel to a transverse axis of the vehicle towards a longitudinal axis of the vehicle from the non-working position to an operational position so as to assume the working position of the table element.

The table element comprises two parts, which in the non-working position are folded-up and abut against one another and for conversion to the working position are hinged about an axis running horizontally, so that faces of the parts run at least essentially in a horizontal plane. In the working position of the table device, the two parts are collapsible, so that a stowing area can be increased and accordingly many and/or large objects can be placed on the table element. In the non-working position the parts are folded-up and are abutted together, so that the space required is reduced correspondingly.

The table element of the table device thus configured may be used both by a vehicle user, i.e., a driver, and by a passenger of the vehicle.

By means of the kinematics for positioning of the table element, automated by the rotary drive, comfort in operation of the table device is greatly increased. Because the table element is flush in the central console in the non-working position, the vehicle user and the passenger are not hampered in any way in positioning from the non-working position to the working position and back again, wherein use of the table element is possible for the vehicle user and for the passenger.

In a further embodiment, the rotary drive comprises a drive unit, which is arranged fixed to the vehicle by means of a retaining element, so that an orientation of the table device is also preset relative to the positioning of the table element.

In a variant of the table device, the drive unit is coupled mechanically to a spindle that is directed towards a vertical axis of the vehicle, which is connected with a pinion with bevel-gear teeth and is resistant to rotation, wherein the pinion with bevel-gear teeth is connected operationally to a toothed element that is coupled mechanically to the bracket and consequently the bracket with the table element secured thereto can be swivelled into the operational position.

A possible variant of the table device envisages that for swivelling sideways, the table element is arranged on the bracket to swivel about an axis running parallel to the longitudinal axis of the vehicle. It is thus possible to swivel the table element either towards the driver or towards the passenger.

In order to be able to swivel the table element sideways, in a possible variant of the table device at least one hinge is arranged on the bracket and/or the table element. By means of the at least one hinge, swivelling sideways can be effected, wherein the table element is in addition connected by means of the at least one hinge to the swivel arm.

In a further possible embodiment, at least one part of the table element and/or of the swivel arm is of hollow configuration at least in sections. In particular, the table element and the swivel arm are of hollow configuration, so that a cable, for example for a USB connection and/or some other connecting element, can be integrated in the table element via the swivel arm.

Furthermore, in one configuration of the table device, the table element is formed from metal and/or plastic, wherein the plastic may be fibre-reinforced, to increase the stiffness of the table element. A metal and/or a plastic is/are selected that has a comparatively low weight, so that the dead weight of the table element is correspondingly low.

In addition, in a possible embodiment, the stowing area of the table element has a non-slip coating, so that sliding of objects placed on the table element, in particular while the vehicle is in motion, can be excluded to the greatest possible extent. The object or objects so placed cling onto the stowing area, so that the risk of falling down and thus being damaged is at least reduced considerably.

The invention further relates to a vehicle with a table device, wherein a table element is secured on a bracket, which is positionable in an operational position by means of a rotary drive, so that the table element can assume a working position, for example for placing objects thereon.

Embodiment examples of the invention are explained in more detail hereunder, on the basis of drawings.

DETAILED DESCRIPTION OF THE DRAWINGS

Parts that are equivalent to one another have been given the same reference symbol in all the figures.

Figure 1:
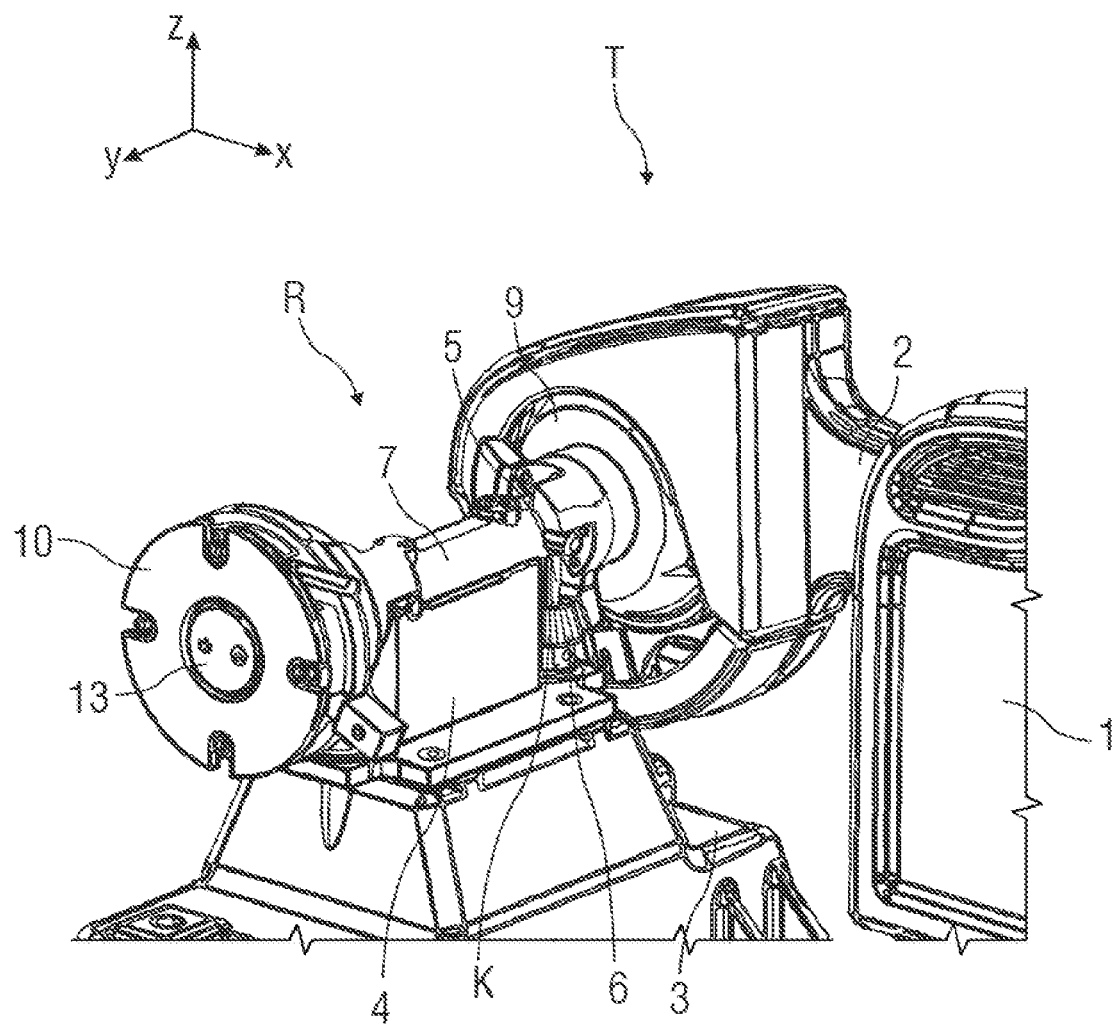
FIG. 1, schematically, is a perspective view of a detail of a table device for a vehicle with a table element in a non-working position.
Figure 2:
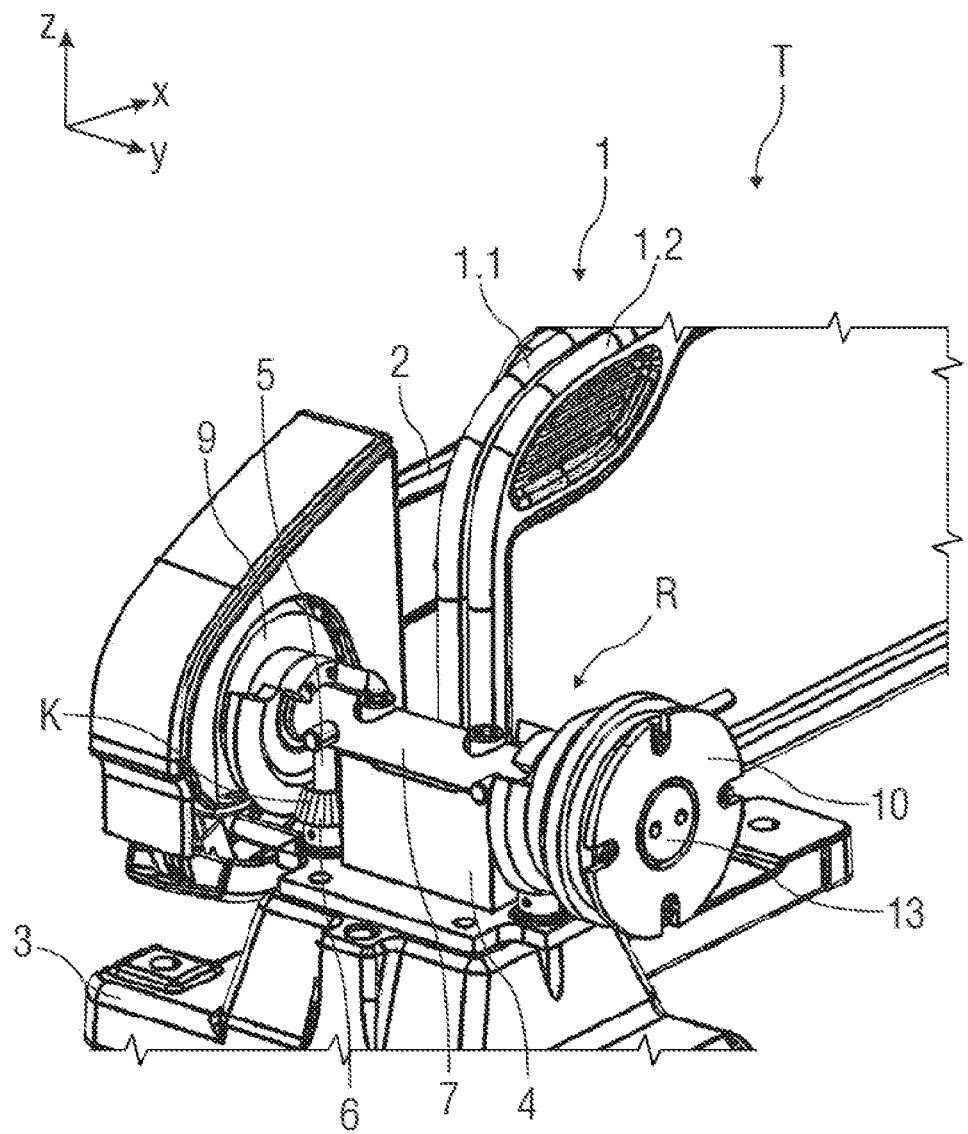
FIG. 2, schematically, is a further perspective view of a detail of the table device with the table element in the non-working position.

FIG. 1 shows a perspective view of a detail of a table device T for a vehicle, which is not shown in more detail, wherein the table device T comprises a table element 1, which has two parts 1.1, 1.2, as is shown in FIG. 2. The table device T is shown in a non-working position, according to the embodiment example in FIG. 1.

In the non-working position, the table element 1, the two parts 1.1, 1.2 of which are folded-up and abut against one another, is arranged vertically in a central console of the vehicle, not shown in more detail, and is thus flush therein, so that neither the table element 1 nor other components of the table device T are visible. Because in the non-working position the two parts 1.1, 1.2 are folded-up and abut against one another, comparatively little space is required in the central console.

Figure 3:
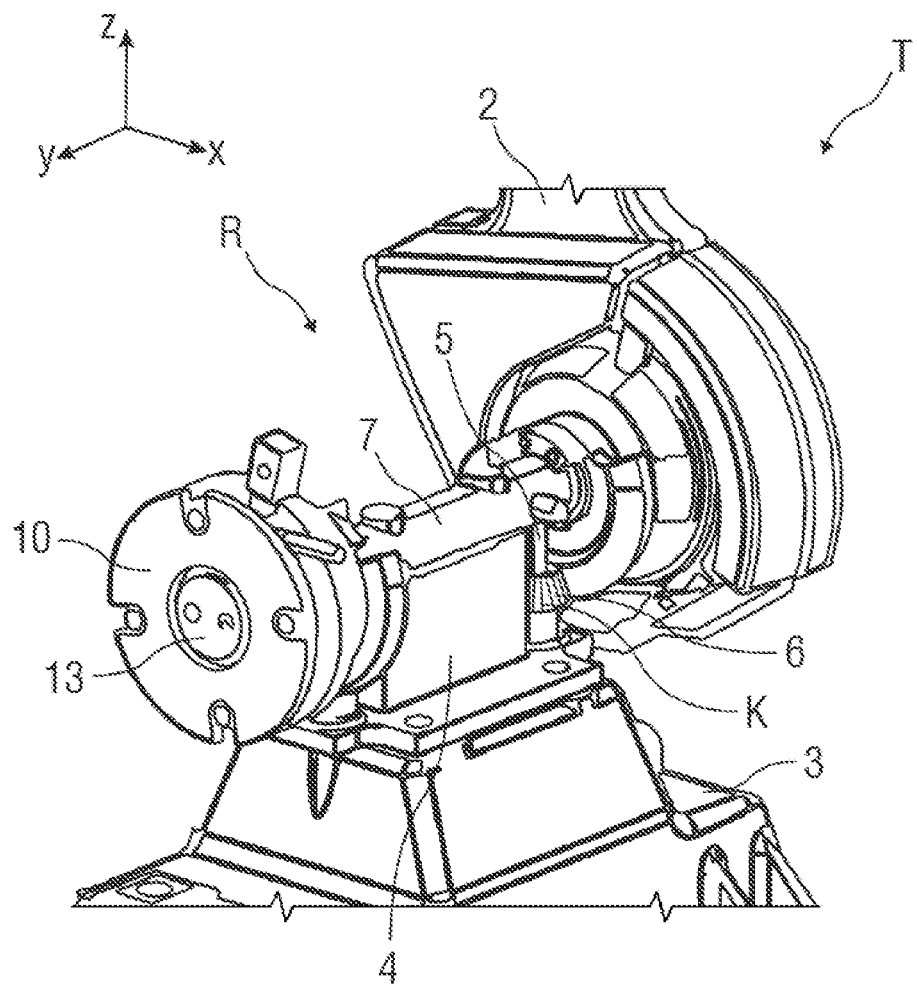
FIG. 3, schematically, is a perspective view of a detail of the table device for a vehicle with the table element in a working position.
Figure 4:
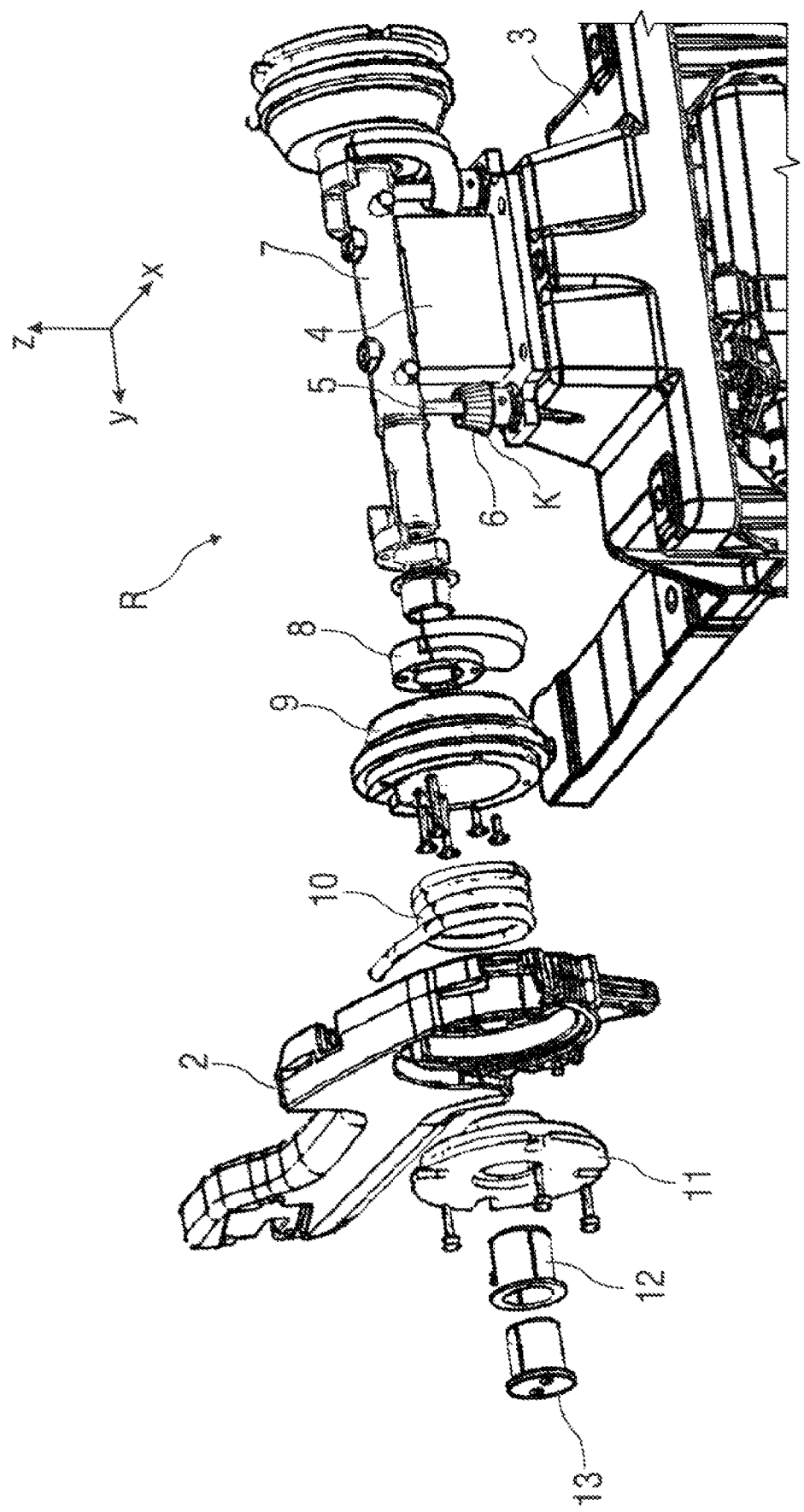
FIG. 4, schematically, is a perspective exploded view of the table device without the table element.
Figure 5:
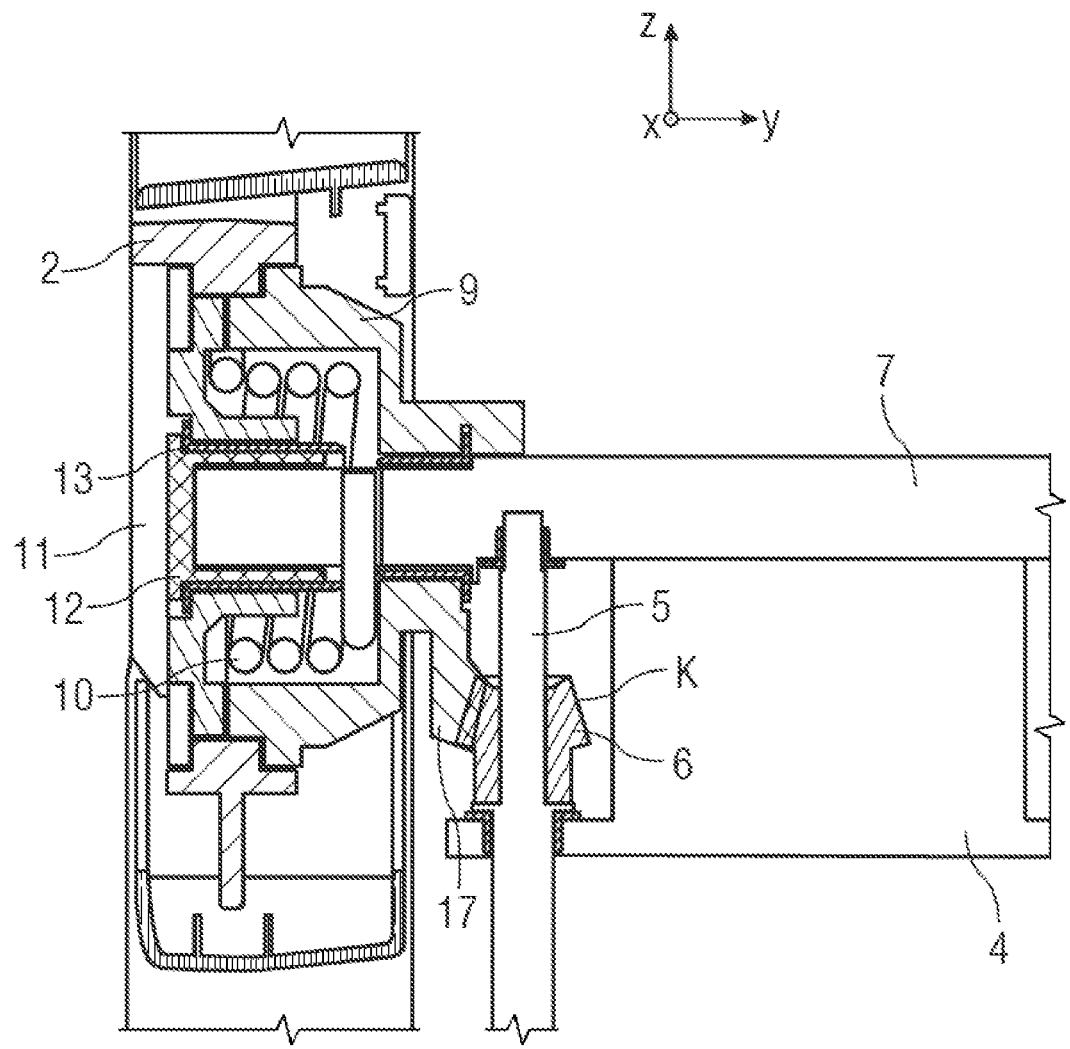
FIG. 5, schematically, is a sectional view of a detail of the table device.

In an operational position of a bracket 2 for assuming a working position of the table element 1, the table device T is shown in a perspective view of a detail of the table device T in FIG. 3, wherein an exploded perspective view of the table device T without the table element 1 is shown in FIG. 4 and a detail of a sectional view of the table device T is shown in FIG. 5.

In the operational position of the table device T, the bracket 2 with the table element 1 is swung out from the central console about an axis parallel to the transverse axis of the vehicle y towards the longitudinal axis of the vehicle x, so that the table element 1, in particular through unfolding of its two parts 1.1, 1.2, assumes the working position. The parts 1.1, 1.2 are hinged about an axis running horizontally, so that in the working position, faces of the parts 1.1, 1.2 run at least essentially in a horizontal plane.

In particular, the two parts 1.1, 1.2 of the table element 1 are formed from a metallic and/or plastic-based material, which may be fiber-reinforced, wherein a respective stowing area or at least the stowing area present in the unfolded state of the table element 1 may be provided with a non-slip coating, so that objects placed thereon cling to the table element 1 and therefore sliding while the vehicle is in motion can be excluded to the greatest possible extent.

Rubber, embossed plastic, a film and/or some other suitable coating may be used as non-slip coating.

Furthermore, the table element 1 can be swung sideways, in particular by means of a hinge arranged on the table element 1 and/or the bracket 2, so that the table element 1 can be positioned in relation to a driver or a passenger of the vehicle. The table element 1 may thus assume a lateral working position.

The table device T comprises the table element 1, the bracket 2 and a rotary drive R, which has a retaining element 3, a drive unit 4, a spindle 5, a pinion 6 with bevel-gear teeth K, a shaft 7, a toothed element 8, an adapter 9, a spring element 10, a thrust bearing 11, a bush 12 and an axial retaining device 13.

In particular, the table device T is arranged in a space provided in the central console, wherein exclusively a segment of the bracket 2 and the table element 1 are arranged outside of the central console in the operational position of the bracket 2.

To simplify operation of the table device T for positioning the table element 1 and thus increasing comfort in the vehicle, the table device T is configured as described hereunder.

The drive unit 4 is coupled mechanically to the spindle 5, so that a rotating movement of the drive unit 4 can be transmitted to the spindle 5 and therefore to the pinion 6 with bevel-gear teeth K mounted non-rotating thereon. Moreover, the spindle 5 is arranged with its longitudinal axis parallel to the vertical axis of the vehicle z.

The pinion 6 is connected operatively to the toothed element 8, so that a rotating movement of the pinion 6 is transmitted to the toothed element 8 and therefore to the bracket 2. For this purpose, the bevel-gear teeth K of the pinion 6 correspond to the teeth of the toothed element 8. The rotating movement of the toothed element 8 is transmitted to the adapter 9, the bracket 2 and the thrust bearing 11.

The toothed element 8 is fastened to the adapter 9, wherein the spring element 10, in the form of a spiral spring, which is in engagement with the bracket 2, is arranged between the adapter 9 and the bracket 2. Moreover, the adapter 9 is connected both to the bracket 2 and to the toothed element 8, in each case secured against rotation.

The thrust bearing 11 bolted to the bracket 2, the bush 12 and the axial retaining device 13 form a termination of the rotary drive R.

Both in the non-working position of the table element 1 and in the operational position of the bracket 2, the spring element 10 is pretensioned, so that generation of noise of the components of the table device T, in particular of the rotary drive R, at least while the vehicle is in motion, can be excluded to the greatest possible extent.

For example, the positioning of the bracket 2 with the table element 1 from the non-working position in the direction of the longitudinal axis of the vehicle x into the operational position and vice versa is brought about by actuating an actuating element arranged in the vehicle, e.g., in the region of an instrument panel, in particular in the region of a central console.

By means of the rotary drive R, the bracket 2 with the table element 1 is thus extended and retracted automatically, wherein the table element 1 is positioned in the working position by swivelling and/or unfolding the two parts 1.1, 1.2.

In one embodiment of the table device T, the table element 1 and the bracket 2 are of hollow configuration, so that at least one cable, for example for a USB connection, may be integrated in the table element 1 and the bracket 2, so that the cable is not arranged loosely on the table device T and does not cause inconvenience.

The invention claimed is:

1. A table device (T) for a passenger compartment of a vehicle, comprising:
   a table element (1) positionable from a non-working position to a working position, wherein in the non-working position the table element (1) is arrangeable vertically in a central console of the vehicle;
   a bracket (2), wherein the table element (1) is disposed on the bracket (2); and
   a rotary drive (R), wherein the bracket (2) is electrically positionable by the rotary drive (R), wherein the rotary drive (R) is configured for swivelling the bracket (2) and the table element (1) about an axis running parallel to a transverse axis (y) of the vehicle and for swivelling the bracket (2) and the table element (1) in a direction of a longitudinal axis (x) of the vehicle from the non-working position to an operational position for assuming the working position of the table element (1);
   wherein the table element (1) comprises two parts (1.1, 1.2) which, in the non-working position, are folded-up and abut against one another and which, for converting to the working position, are hinged about an axis running horizontally such that respective faces of the two parts (1.1, 1.2) run at least essentially in a horizontal plane;
   wherein the rotary drive (R) comprises a drive unit (4) which is securely fastenable to the vehicle by a retaining element (3);
   wherein the drive unit (4) is coupled mechanically to a spindle (5) running in a direction of a vertical axis (z) of the vehicle, wherein the spindle (5) is connected to a pinion (6) with a bevel gearing (K) mounted non-rotatably on the pinion (6), and wherein the pinion (6)

with the bevel gearing (K) is connected operatively to a toothed element (8) coupled mechanically to the bracket (2).

2. The table device (T) according to claim 1, wherein the table element (1) is swivelable on the bracket (2) and is swivelable sideways, about the axis running horizontally, into the working position.

3. The table device (T) according to claim 2, further comprising a hinge disposed on the bracket (2) or on the table element (1) for sideways swivelling of the table element (1).

4. The table device (T) according to claim 1, wherein at least one of the two parts (1.1, 1.2) of the table element (1) and the bracket (2), at least in a respective section, are hollow.

5. The table device (T) according to claim 1, wherein the table element (1) is a metal or a plastic.

6. The table device (T) according to claim 1, wherein a stowing area of the table element (1) has a non-slip coating.

7. A vehicle, comprising:
the table device (T) according to claim 1.

\* \* \* \* \*